UNITED STATES PATENT OFFICE.

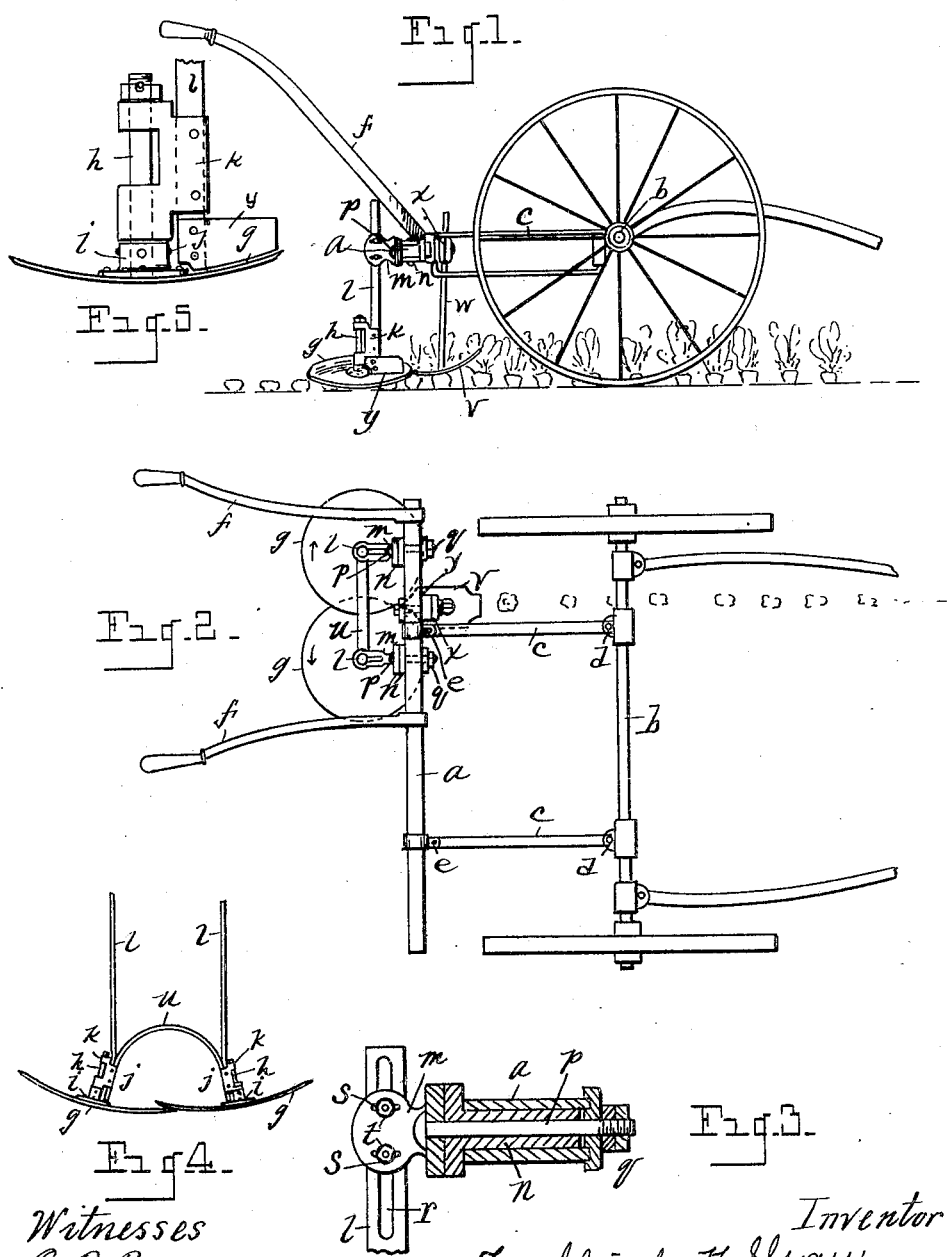

FRANKLIN W. H. SHAW, OF TOWNSHIP OF GORE OF CHATHAM, ONTARIO, CANADA.

APPARATUS FOR TOPPING BEETS.

No. 804,889.　　　Specification of Letters Patent.　　　Patented Nov. 21, 1905.

Application filed March 27, 1905. Serial No. 252,393.

*To all whom it may concern:*

Be it known that I, FRANKLIN W. H. SHAW, a subject of the King of Great Britain, residing in the township of Gore of Chatham, county of Kent, Province of Ontario, Canada, have invented a certain new and useful Improvement in Apparatus for Topping Beets, of which the following is a specification, reference being had to the accompanying drawings, which form a part of this specification.

My invention has for its object to provide certain new and useful improvements in apparatus for topping beets; and it consists of the construction, combination, and arrangement of devices hereinafter described and claimed, and illustrated in the accompanying drawings, in which—

Figure 1 is a view in side elevation, illustrating features of my invention, said figure showing the frame of an ordinary wheeled beet-cultivator, the cultivator devices being removed and my improved topping attachments substituted in place thereof. Fig. 2 is a plan view of the same. Fig. 3 is a detail view, partly in section, of certain features of the device. Fig. 4 is a detail view in elevation, illustrating the means of connecting the disks. Fig. 5 is an enlarged view showing the means of connecting the disks with their vertical supporting-standards.

More particularly my invention is designed as an improvement on apparatus for topping beets embodied in Letters Patent of the United States to O. S. Martin, No. 778,830, December 27, 1904.

As in the patent referred to, the object of my invention is to provide apparatus for cutting off the tops of the beets while the beets are in the ground. The apparatus embodied in my present invention, however, is particularly designed to be capable of attachment to an ordinary beet-cultivator frame or to the frame of various agricultural instruments of a similar nature having a swiveled frame, my present invention not being limited to its application solely to the frame of a beet-lifter.

It is evident that an apparatus of this nature capable of attachment to a beet-cultivator or to various ordinary farm implements, such as a farmer would already have in possession, can be more economically constructed and put upon the market and into use than is the case where the apparatus must form a part of a frame particularly constructed therefor.

In other respects also my invention is designed to simplify and economize the construction of the apparatus and to increase its efficiency, the apparatus being so constructed as to avoid the liability of the same being clogged by the tops of the beets.

The apparatus embodied in my invention is not only capable or ready attachment to the frame of various farm instruments, but it is also constructed so as to be readily adjusted as may be required.

I carry out my invention as follows:

In the drawings, $a$ represents any suitable supporting-frame—a cultivator-frame, for example—the same being shown connected with the axle $b$ by connecting the arms $c$ $c$, having a jointed engagement with the axle, as indicated at $d$, and with the rear cross-bar of the frame, as indicated at $e$. In this manner the frame constitutes a swivel-frame capable of lateral movement, as may be desired, the lateral movement being readily accomplished by the operator through the instrumentality of suitable handles, (indicated at $f$.) Suspended from the frame is a pair of rotatable cutting-disks, (indicated at $g$ $g$,) said disks being suspended in such a manner as to permit of a vertical movement, so that the cutting edges of the disk may rise or fall together in contact with the tops of the various beets in the row, notwithstanding the variations of the beets in height or variations in the surface of the ground. The cutting-disks are preferably so arranged that the cutting edges will slightly overlap each other. Each of the disks is suspended from the lower end of a corresponding upright or spindle, (indicated at $h$.) The adjustment of each of the disks to the corresponding upright is preferably accomplished by securing upon the upper faces of the disk a socket (indicated at $i$) constructed to receive the lower end of the corresponding upright $h$ and to be secured thereto, as by means of one or more bolts, (indicated at $j$.) Above the socket $i$ is engaged a web or casting $k$, in which the spindle is journaled and to which is engaged a supporting-standard, (indicated at $l$.) The supporting-standards $l$ are engaged toward their upper ends with a supporting-arm $m$, secured in any suitable manner upon the frame $a$. As shown, the frame is provided with a hollow arm (indicated at *n*) connected with the frame *a*—for example, by means of a bolt *p*—the hollow arm being passed through the transverse bar of the frame, the bolt *p* passing through the hollow arm and connected with the arm *m*, a nut *q* securing the parts in place. The arm *m* has an adjustable engagement with the hollow arm *n*. The plates *m* are shown provided with elongated arc-shaped orifices *s*, through which the standard is bolted to said arm, as indicated at *t*. It is obvious that the standard *l* may swing or oscillate upon the upper bolt. This construction permits the supporting-standard *l* to be set at any desired angle for the proper adjustment of the rotatable cutting-disks. The cutting-disks are rotatable freely by contact with the ground or with the beet-tops. The two cutting-disks are connected by an upwardly-extending bow *u*, the lower extremities of the bow being preferably engaged with the lower extremities of the standards *l* and with the castings *k*. The shape of the bow permits the beet-tops to readily pass thereunder without clogging the machine. My invention also contemplates the provision of a runner (indicated at *y*) located in advance of the adjacent edges of the cutting-disks, said runner being supported upon a standard *w*, adjustably engaged in the arm *x*, secured upon the frame *a*. The supporting mechanism for the standard of the runner may be a duplicate of the supporting mechanism shown for the standard *l*. The runner is preferably prolonged and is intended to ride upon the irregular tops of the upright beets, the runner rising and falling with the irregularities of the tops of the beets in height. The runner in its undulatory or vertical movement will obviously carry with it the swinging arm *a*, and consequently the cutting-disks will have a corresponding vertical movement, so that the tops of the beets will be cut off at equal distances, notwithstanding their irregularities in height, the runner dropping by gravity when free to move outward, and rising by contact with the beet-tops of greater height than the one preceding. The runner thus raises or lowers the swinging frame of the machines according to the unevenness of the beet-tops before they are cut.

The standard *w* may be adjusted vertically, as may be required in the supporting mechanism connected with the frame, so as to cut off more or less of the beets, as desired.

The superiority of my present invention over apparatus for topping beets heretofore constructed will now be understood, inasmuch as it may be adapted, as already set forth, to any agricultural implement having a swinging frame. Thus, for example, in a spring-toothed cultivator of ordinary construction we find a springing frame provided with mechanisms secured thereto to carry the spring-teeth. My invention contemplates, for example, simply removing the spring-teeth from the cultivator and attaching my standards *l*, carrying the cutting-disks in the place of two of said teeth and by the same supporting mechanism as that employed to carry the teeth, a similar supporting mechanism being attached also to the frame to carry the supporting-standard for the runner.

I prefer to employ, in addition to the foregoing, a cleaner or scraper, (indicated at *y*, Fig. 5,) which may be attached to the lower end of the corresponding standard *l*, said scraper preferably extending to the outer edge of the adjacent disk to keep the disk clear of the beet-tops.

What I claim as my invention is—

1. In an apparatus for topping beets the combination of a frame, rotatable cutting-disks, vertical spindles carrying said disks, webs or castings in which said spindles are journaled, vertical standards connected at their lower ends with said webs or castings and extending therethrough and radially-extended scrapers attached to the lower ends of each of said standards adjacent to the corresponding disk.

2. In an apparatus for topping beets, the combination with an agricultural implement provided with a swinging frame, and with wheels supporting said frame, of overlapping circular cutting-disks concaved upon their upper faces and rotatable by frictional contact with an obstacle, vertical spindles carrying said disks respectively, webs or castings in which said spindles are journaled, vertical standards connected at their lower ends with said webs or castings respectively, to carry such disks, a bow-shaped bar connecting said standards, mechanism on the frame in which said standards are adjustably engaged, a runner in advance of said disks, a supporting-standard for said runner adjustably connected with the frame, and radially-extended scrapers attached to the lower ends of each of the standards supporting the disks adjacent to the corresponding disks.

In testimony whereof I have signed this specification in the presence of two subscribing witnesses.

FRANKLIN W. H. SHAW.

Witnesses:
W. W. LOGAN,
E. H. RUTTON.